(12) United States Patent
Devillers

(10) Patent No.: US 7,080,318 B2
(45) Date of Patent: Jul. 18, 2006

(54) SCHEMA, SYNTACTIC ANALYSIS METHOD AND METHOD OF GENERATING A BIT STREAM BASED ON A SCHEMA

(75) Inventor: Sylvain Devillers, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 551 days.

(21) Appl. No.: 10/258,924

(22) PCT Filed: Feb. 8, 2002

(86) PCT No.: PCT/IB02/00393

§ 371 (c)(1),
(2), (4) Date: Oct. 28, 2002

(87) PCT Pub. No.: WO02/069187

PCT Pub. Date: Sep. 6, 2002

(65) Prior Publication Data

US 2003/0177341 A1    Sep. 18, 2003

(30) Foreign Application Priority Data

Feb. 28, 2001    (FR)    .................................. 01 02764

(51) Int. Cl.
*G06F 15/00*    (2006.01)
*G06F 9/45*    (2006.01)
(52) U.S. Cl. ...................... 715/513; 717/143
(58) Field of Classification Search ................ 715/513, 715/500, 514; 717/143, 144
See application file for complete search history.

(56) References Cited

U.S. PATENT DOCUMENTS

| | | | | |
|---|---|---|---|---|
| 4,533,958 | A   * | 8/1985  | Herget ...................... 358/426.1 |
| 4,725,815 | A   * | 2/1988  | Mitchell et al. .............. 341/67 |
| 6,631,519 | B1 * | 10/2003 | Nicholson et al. .......... 717/169 |
| 6,721,758 | B1 * | 4/2004  | Jex et al. ..................... 717/165 |
| 6,871,204 | B1 * | 3/2005  | Krishnaprasad et al. .... 707/102 |
| 6,898,604 | B1 * | 5/2005  | Ballinger et al. ............ 707/101 |
| 2001/0044811 | A1 * | 11/2001 | Ballantyne et al. ......... 707/513 |
| 2001/0054172 | A1 * | 12/2001 | Tuatini .......................... 717/1 |
| 2003/0069908 | A1 * | 4/2003  | Anthony et al. ............. 707/513 |
| 2004/0039903 | A1 * | 2/2004  | Wise et al. .................. 712/300 |
| 2004/0054692 | A1 * | 3/2004  | Seyrat et al. ............. 707/104.1 |
| 2004/0107402 | A1 * | 6/2004  | Seyrat et al. ............... 715/513 |
| 2005/0031031 | A1 * | 2/2005  | Osorio .................. 375/240.01 |
| 2005/0125781 | A1 * | 6/2005  | Swamy et al. .............. 717/144 |

OTHER PUBLICATIONS

DeRose, XML Linking, ACM 2000, pp. 1-12.*
Fan et al., Integrity Constraints for XML, ACM 2000, pp. 23-34.*
Buneman et al., Interaction between Path and Type Constraints, ACM 1999, pp. 56-67.*
McLaughlin, Validation with Java and XML Schema, Part 4; Build Java Representations of Schema Constraints and Apply Them to Java data, ProQuest Jan. 3, 2001, pp. 1-25.*

* cited by examiner

*Primary Examiner*—Cong-Lac Huynh

(57) ABSTRACT

The invention proposes a new type of schema derived from the XML schema which permits to describe a coding format in a generic fashion. Such a schema is used to carry out the syntactic analysis of a bit stream to produce a document that represents the bit stream which is an instance of said schema, or to generate a bit stream from a document representing the bit stream.

5 Claims, 1 Drawing Sheet

Figure 1:
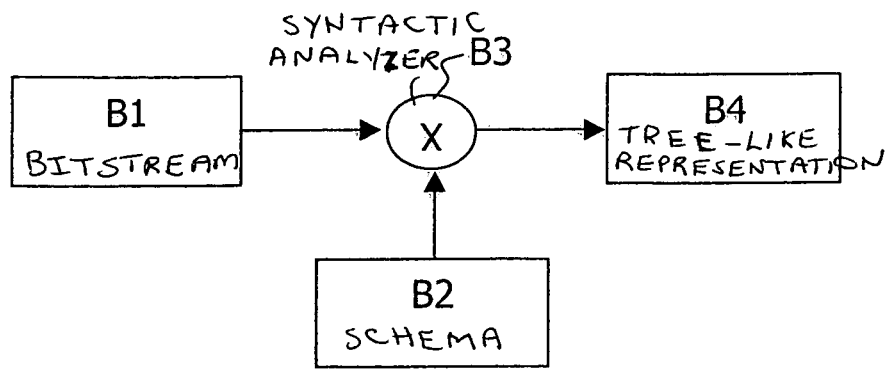

SCHEMA, SYNTACTIC ANALYSIS METHOD AND METHOD OF GENERATING A BIT STREAM BASED ON A SCHEMA

The present invention relates to a method of syntactically analyzing a bit stream containing data which have a structure and contents conforming to a certain format said method being intended to generate a tree-like representation of said stream. The invention also relates to a method of generating a bit stream according to a certain format, from a document which is a tree-like representation of said bit stream and which contains data, notably imported data, by using a certain import mode. The invention also relates to a schema defining one or various types of data which may have one or various facets, and comprising a plurality of elements for which it describes a name, a type of data, an interleaving, an order and a number of occurrences predefined or random, the occurrence of an element being mandatory or optional.

The invention also relates to computer programs for implementing such methods, a processing unit which contains storage means for storing such a schema and such computer programs, as well as a transmission system which comprises at least a source entity and a destination entity, said source entity having means for storing such a schema and one or such programs.

The invention has applications in the field of editing, modification and merging of contents.

An example of application of the invention is the adaptation of contents to be transmitted to a destination as a function of the user profile (screen, calculation capacity, storage capacity, link used for the transmission . . . ). Such adaptation notably permits to avoid the useless transmission of the data which the recipient will not be able to use, and thus to save on the passband.

With respect to this, French patent application no. 0101530 filed 5 Feb. 2001 by Koninklijke Philips Electronics N.V. has already described a generation method for generating a file with certain characteristic features from a basic document written in a mark-up language and describing a basic progressive file, said method comprising a transformation step of generating a transformed document by applying to the basic document a predefined transformation which is a function of said characteristic features, the file with said characteristic features being generated from the transformed document. This method consists in executing the necessary transformations on a basic document in which the structure of the progressive file is apparent. It permits to avoid having to decode the basic progressive file to recode it differently.

However, this file generation method implies the generation of a basic document which describes the basic progressive file, and then the generation of another file from the transformed document.

It is an object of the present invention to propose an automatic and generic method of performing such operations.

Therefore, the invention notably comprises proposing a new type of schema which permits to describe a coding format in a generic manner.

A schema according to the invention defines one or various types of data which may have one or various facets. The schema comprises a plurality of elements for which it describes a name, a type of data, an interleaving, an order and a number of predefined or random occurrences, the occurrence of an element being mandatory or optional. And it is characterized in that it has at least one of the following characteristic features:

it defines a type of data which corresponds to binary segments of indefinite length and which has at least a facet relating to a data import mode and optionally a facet relating to a stop flag of a binary segment, it defines one or more types of data which correspond to binary words of predefined length or lengths and have at least a facet relating to said length and, optionally, a facet relating to padding bits contained in said binary words, it defines one or more variables constituted by a data access path and it comprises one or more conditional branches to describe various structures or possible contents as a function of the value or of the or said variables.

A method according to the invention of syntactically analyzing a bit stream which contains data which have a structure and contents according to a certain format to generate a tree-like representation of said stream is characterized in that it comprises:

A) reading a schema which, for generically describing said format:

a) defines one or more types of data which may contain one or more facets, notably:

when said format uses binary words of predefined length or lengths; one or more types of data corresponding to said binary words of predefined length or lengths said types of data having at least one facet relating to said length and, when said binary words of predefined length or lengths may contain one or more padding bits, said type of data having a facet relating to said padding bits, when said format uses binary segments of indefinite length which have contents intended to be imported in said representation by using a certain import mode, a type of data corresponding to said binary segments said type of data having at least one facet relating to said import mode and, when said binary segments are defined by a stop flag, said type of data having one facet relating to said stop flag, b) comprises a plurality of elements for which it describes a name, a type of data, an interleaving, a predefined or random order and number of occurrences, the occurrence of an element being mandatory or optional, c) when said format provides that data situated at the front of said bit stream give information about the structure or the contents of the rest of said bit stream, defines in said tree-like representation one or various variables constituted by an access path to said data situated at the front, and comprises one or more conditional branches to describe various possible structures or contents as a function of the value of said variable or variables, B) searching in said bit stream for the data that correspond to the elements contained in said schema, C) generating an instance of said schema which contains the data found in said bit stream and which constitutes said tree-like representation.

The invention thus comprises producing a tool that permits to generically describe a format in a schema. The invention then comprises the use of such a schema for analyzing the syntax of a bit stream according to said format so as to generate a document that represents said stream and that is an instance of said schema. The schema specifies the various types of data which may be contained in a bit stream according to said format, as well as the manner of including these data in the final document. The types of data specified in the schema and the rules of inclusion in the final document depend on the format considered.

By way of example, when the format considered is the JPEG2000 format (ISO/IEC FCD standard 15444-1), said schema:

defines various data types which correspond to binary words of predefined lengths which may comprise padding bits and which have a facet relating to said length and one or more facets relating to said padding bits, defines a data type that corresponds to binary segments of indefinite length, defined by a stop flag and having contents intended to be imported in said representation via the use of a certain import mode, and which has a facet relating to an import mode and a facet relating to said stop flag, defines one or more variables constituted by an access path in said tree-like representation to data situated at the front of said bit stream and which give information about the structure or the contents of the rest of said bit stream, and comprises one or more conditional branches to describe the various structures or contents which are possible as a function of the value of said variables.

A method according to the invention of generating a bit stream according to a certain format from a document which is a tree-like representation of said bit stream and which contains data, notably data imported by the use of a certain import mode, is characterized in that it comprises:

A) reading said document,
B) reading in parallel a schema for generically describing said format:
a) defines one or more types of data which may have one or more facets, notably:
a type of data corresponding to binary segments of indefinite length which have at least a facet that relates to said import mode
and, when said format uses binary words of predefined length or lengths, one or more types of data corresponding to said binary words of predefined length or lengths which have at least a facet that relates to said length, and when said binary words contain one or more padding bits, a facet that relates to said padding bits,
b) comprises a plurality of elements for which it describes a name, a type of data, an interleaving, an order and a number of predefined or random occurrences, the occurrence of an element being mandatory or optional,
C) coding said data as a function of the type defined,
D) constituting a bit stream from the coded data.

The invention thus also comprises the use of a schema of the type described above for generating a bit stream from a document that represents the bit stream and which is an instance of said schema. The document and the schema are read in parallel to determine the type of data contained in the document so as to code them in accordance with that which the format provides, and to constitute a bit stream with the coded data.

These and other aspects of the invention are apparent from and will be elucidated, by way of non-limitative example, with reference to the embodiment(s) described hereinafter.

Figure 2:
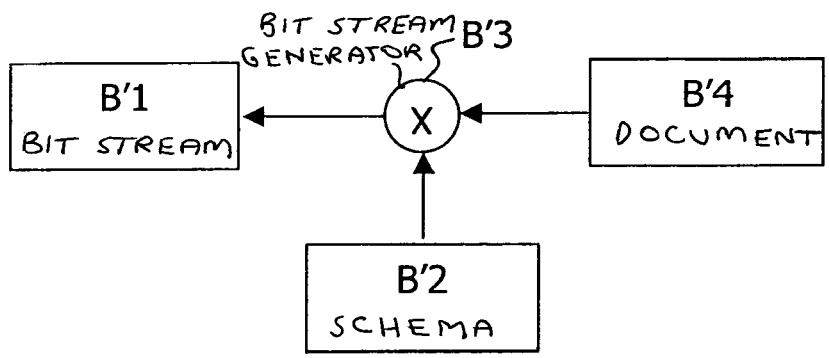
Figure 3:
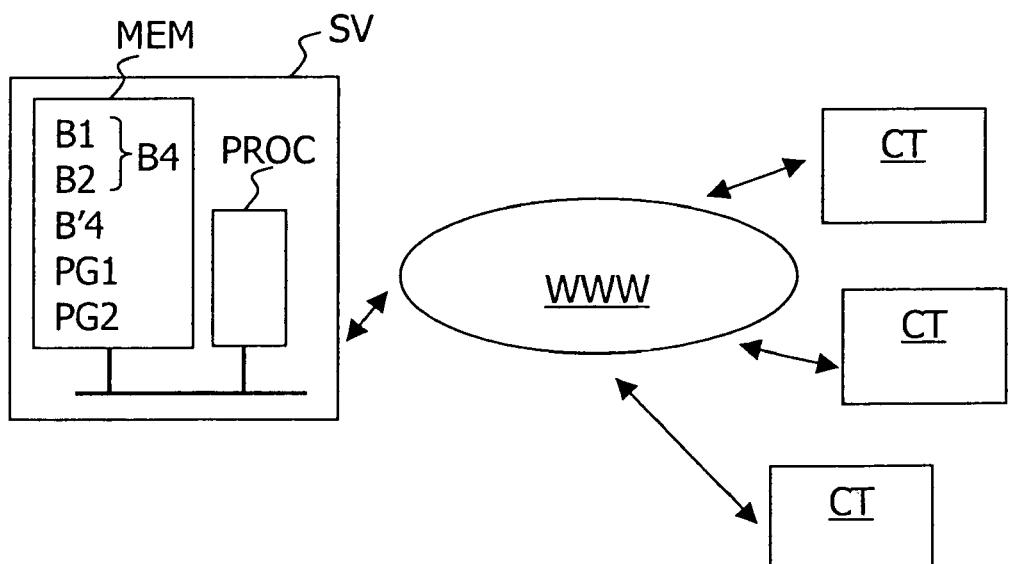

In the drawings:

FIG. 1 represents a block diagram summarizing the basic mode of operation of a syntactic analysis method according to the invention, FIG. 2 represents a block diagram summarizing the basic mode of operation of a bit stream generation method according to the invention, and FIG. 3 is an example of a transmission system according to the invention.

In FIG. 1 is represented a block diagram explaining the basic mode of operation of a syntactic analysis method according to the invention. A block B1 represents a bit stream according to a predefined format. A block B2 represents a schema which generically describes said predetermined format. A block B3 represents a syntactic analyzer which permits to make a syntactic analysis of the bit stream B1 so as to generate a document B4 which is a tree-like representation of the bit stream B1 and an instance of the schema B2.

The schema B2 describes the syntax of the bit stream. It notably specifies the type of data which may occur in the bit stream and the manner in which they are to be included in the document. The tree-like representation B4 is generated depending on the analysis of the bit stream B1.

In FIG. 2 is represented a block diagram explaining the operating principle of a bit stream generation method according to the invention. A block B'2 represents a schema which describes a coding format in a generic manner. A block B'4 represents a document which is an instance of the schema B'2. A block B'3 represents a bit stream generator which permits to read the document B'4 and the schema B'2 in parallel to generate a bit stream B'1. Advantageously, the schemas B2 and B'2 used for the same coding format are identical.

The document B'4 is read with the schema B'2 so as to determine the type of data which are contained in the document B'4. For a value read from the document B'4 the corresponding type of data found in the schema B'2 determines the coding mode to be used for coding said value.

It is generally certainly not necessary to give complete details of the structure of the coding format in the schema. The degree of detail depends on the application considered. For the use described in French patent application no. 0101530 already cited in the introduction of the present application (method of generating a file—for example a JPEG2000 file—having characteristic features adapted to the profile of the recipient), certain segments of JPEG2000 markers are to be given in detail parameter by parameter to permit to recover said parameters and modify them. Other segments of markers are processed as a block because it is not necessary to have access to the parameters they contain.

The documents B4 and B'4 are advantageously XML documents and the schemas B2 and B'2 are written in a new language derived from the XML schema language. XML is a recommendation of the consortium W3C (eXtensible Markup Language 1.0 dated 6 Oct. 2000), and the XML schema is a recommendation project of the same W3C consortium dated 24 Oct. 2000. The XML recommendation and the XML schema recommendation project are available on the Internet site http://www.w3.org/. However, this is not restrictive and the principles of the invention which have been described in detail in the rest of the description may be utilized by utilizing languages of a different type, for example, languages of the type DSD (Document Structure Description) proposed by AT&T and BRICS of the university of Aarhus in Denmark and available on the Internet site http://www.brics.dk/DSD/.

From a physical point of view an XML document notably comprises entities which may be analyzed and contain text, that is to say, a sequence of characters belonging to a predefined set of characters and which represent a tag or textual data.

From a point of view of logics, an XML document contains one or more elements whose limits are marked by a start flag and a stop flag. Elements may be interleaving. Each element is identified by a name which is indicated in its start flag and in its stop flag. An element may have a value. The value of an element is placed between its start flag and its stop flag.

In the example that will be described below, the data are chosen to be placed directly in the elements of the XML document so as to simply the implementation (that is to say, that the data contained in the XML document constitute values of XML elements).

XML schema is a schema language which permits to specify the contents and the XML document structure: more particularly, an XML schema permits to describe elements and for each element a name, a type of data, an interleaving, a frequency of appearance and a number of occurrences. The order of appearance and the number of occurrences may be predefined or random. The occurrence of an element may be mandatory or optional.

A schema defines a class of XML documents. An instance of an XML schema is an XML document which is valid with respect to said schema.

In the following of the description and to give a concrete example of implementing the invention, bit streams of the JPEG2000 format will be considered. This is no longer restrictive and it is clear that the invention may be applied to other formats. For certain formats it may be necessary to add other types of data to those that are described here.

In annex A an example of a schema is given which describes the JPEG2000 coding format. This schema utilizes simple types of data which are generic and which are defined in annex B, and simple types of data derived from these generic types which are defined in annex C. Annex D gives an example of an XML document which is an instance of the schema given in annex A and which represents a JPEG2000 bit stream. In the annexes A, B and C and in the following of the description, the letters <<xsd>> identify the tools which are defined in an XML schema. And the letters <<bsd>> identify the tools which are added by the invention.

According to the invention, the schema B2 (which is considered identical to schema B'2 in the following of the description) defines the type of all the data which may be contained in a stream according to the JPEG2000 format. Certain types of data already exist in the XML schema language and can directly be used. Others are to be modified. Others must be added.

A bit stream according to the JPEG2000 format more particularly contains the following types of data:
1) binary segments of indefinite lengths whose contents may be imported in an XML document via the use of a first or a second import mode described below.
2) binary words of different lengths which may contain padding bits which are not significant,
3) markers whose value is defined in hexadecimal code in the JPEG2000 standard and which are imported in hexadecimal code in the XML document. This import in hexadecimal code constitutes a third import mode.

The first import mode comprises converting the binary data into characters which belong to a predefined set of characters used by XML. For this purpose, a coding method is advantageously used known by the name of <<base 64>> and described in paragraph 6.8 of the document RFC 2045 published by the IETF. This method comprises dividing the binary data and converting them into groups of 6 bits and associating to each group of 6 bits a character of the predefined set of characters. This first import mode causes an expansion of the data by 33%.

In the second import mode, in lieu of converting the binary data into characters to insert them directly into the XML document, pointers to an area of a binary file containing said binary data are introduced in the XML document. The XML document then becomes dependent on said binary file.

In the XML schema language a type of data is defined as a triplet which comprises:
a set of values called value space,
a set of lexical representations called lexical space,
a set of facets, a facet corresponding to a constraint imposed on the value space.

For implementing the invention, the coding of the data which are written in the bit stream is to be unequivocal and implicit. Certain types of data which previously existed in the XML schema and are unequivocal and implicit are used directly: this is the case, for example, with types of <<xsd: unsignedshort>> data, which represents an integer between −32768 and +32767 and which may thus be implicitly coded in two bytes. This is also the case with <<xsd: unsignedInt>> and <<xsd: unsignedByte>>.

According to the invention also the type of data <<xsd: binary>> is used but by modifying it:
1) A facet is added thereto relating to a stop flag entitled <<bsd: stopFlagExclusive>>. This facet will be used to indicate the end of a binary segment of indefinite length: for example, the JPEG2000 packets which are binary segments of indefinite length are defined either by a marker SOP (Start Of Packet) or by a marker SOT (Start Of Tile) or by a marker EOC (End Of Code stream); thus for a JPEG2000 packet this facet will have one of the three values FF51 (SOP), FF90 (SOT) or FFD9 (EOC).
2) A new possible value is added to the <<encoding>> facet which already exists in the XML schema language with the values <<hex>> for hexadecimal code and <<base 64>> for the import after a base 64 conversion. The new added value is called <<externalData>>. It is used to indicate that the data are imported in the XML document by the use of the second import mode mentioned above (introduction in the XML document of a pointer which points to the bit stream area which contains the data concerned).

This modified type of data is entitled <<binaryNoLength>> and is defined in the following manner in the annex C:

```
<xsd:simpleType name="binaryNoLength">
    <xsd:annotation>
        <xsd:appinfo>
            <!-- Read data until a flag is found -->
            <xsd:hasFacet name="stopFlagExclusive"/>
            <!-- How binary data should be instantiated : -->
            <!-- base64, hex (same as for xsd:binary) -->
            <!-- externalData (URI pointing to an external
            entity data segment)-->
            <xsd:hasFacet name="encoding"/>
        </xsd:appinfo>
    </xsd:annotation>
    <xsd:restrictionbase="xsd:anySimpleType"/>
</xsd:simpleType>
```

This modified type of data, which is a generic type, is then used to derive other types of specific data which may be found in an XML bit stream. For example, as indicated in annex B the type <<PacketDataType>>, which corresponds to the JPEG2000 packets, is derived from the generic type <<binaryNoLength>>. In this example it is seen that the data contained in these packets are imported in the XML document by the use of the second import mode (pointer to the area of the bit stream which contains the data). It is also seen that a JPEG2000 packet is defined by a marker which has one of the following three values: FF51, FFD9 or FF90.

```
<xsd:simpleType name="packetDataType">
    <xsd:restriction base="bsd:binaryNoLength">
        <xsd:encoding value="externalData"/>
            <bsd:stopFlagExclusive value="FF51|FFD9|FF90"/>
    </xsd:restriction>
</xsd:simpleType>
```

While reference is made to annex A, it is found that other elements have a type derived from <<binaryNoLength>>, for example, the element entitled <<Data>> in the element of the complex COC type. This element <<Data>> has a facet <<encoding>> whose value is <<base 64>>, which means that the corresponding data are imported from the bit stream in the XML document by using a base 64 conversion.

```
<xsd:complexType name="COCType">
    <xsd:sequence>
        <xsd:element name="Marker>> type="jp2:markerType>>
        fixed="ff53"/>
        <xsd:element name="Lcoc>> type="xsd:unsignedShort"/>
        <xsd:element name="data">
            <xsd:simpleType>
                <xsd:restrictionbase="xsd:binary">
                    <xsd:length value="$Lcoc"/>
                    <xsd:encoding value="base64"/>
                </xsd:restriction>
            </xsd:simpleType>
        </xsd:element>
    </xsd:sequence>
</xsd:complexType>
```

The invention also comprises the addition of a new type of data intended to be used for the binary words of predefined length. This new type of data is entitled <<bsd:bitsArray>> and it contains three facets: one facet entitled <<bitsLength>> relating to the length of the binary word, one facet entitled <<prePadding>> relating to the number of padding bits placed before the significant bit or bits, and one facet entitled <<postPadding>> relating to the number of padding bits placed after the significant bit or bits. This new type of data is defined in the annex C in the following manner:

```
<xsd:simpleType name="bitsArray">
    <xsd:annotation>
        <xsd:appinfo>
            <xsd:hasFacet name="bitsLength"/>
            <xsd:hasFacet name="prePadding"/>
            <xsd:hasFacet name="postPadding"/>
        </xsd:appinfo>
    </xsd:annotation>
    <xsd:restriction base="xsd:anySimpleType"/>
</xsd:simpleType>
```

As indicated in annex B, this new type of data which is a generic type of data is then used to derive specific types of data which may be found in a JPEG2000 stream. For example, the type of data entitled <<11b>>, which is derived from the generic type of data <<bitsArray>>, corresponds to a binary word of 11 bits which does not contain padding bits:

```
<xsd:simpleType name="11b">
    <xsd:restriction base="bsd:bitsArray">
        <bsd:bitsLength value="11"/>
    </xsd:restriction>
</xsd:simpleType>
```

And the type of data entitled <<5b3p>>, which is also derived from the generic type of data <<bitsArray>>, corresponds to a binary word of 5 bits which comprises 2 significant bits followed by 3 padding bits.

```
<xsd:simpleType name="5b3p">
    <xsd:restriction base="bsd:bitsArray">
        <bsd:bitsLength value="5"/>
        <bsd:postPadding value="3"/>
    </xsd:restriction>
</xsd:simpleType>
```

With reference to annex A it is found that the type of data <<11b>> is used, for example, for the element named <<mantissa>>:

<xsd:element name="mantissa>>type="jp2:11b"/> and that the type of data <<5b3p>> is used, for example, for the element named <<exponent>:

<xsd:element name="exponent>>type="jp2:5b3p"/>

From a point of view of structure the invention utilizes the following tools which already exist in the XML schema:

the simple and complex types of data <<xsd: simple Type>> and <<xsd: complex Type>>, the elements <<xsd: element>>, the group models <<xsd: group>> the connectors <<xsd: sequence>>, <<xsd: all>> and, possibly, <<xsd: choice>>.

The syntactic analyzer B3 reads the bit stream B1 with the schema B2 to generate a tree-like representation B4 of the bit stream B1. This tree-like representation B4 is an instance of the schema B2. It is generated recursively by interpreting the connectors found in the schema.

More particularly, the connector <<xsd: sequence>> is interpreted by the syntactic analyzer in the following manner: when the syntactic analyzer finds a connector <<xsd: sequence>>, it reads the elements in the bit stream in a same order as in the schema. For example, a connector <<xsd: sequence>> is used in the elements of the type <<CodestreamType>> defined in annex A.

```
<xsd:complexType name="CodestreamType">
    <xsd:sequence>
        <xsd:element name="MainHeader>>
        type="jp2:MainHeaderType"/>
        <xsd:element name="Tile>> type="jp2:TileType"/>
        <xsd:element name="EOC>> type="jp2:EOCType"/>
    </xsd:sequence>
</xsd:complexType>
```

According to this definition, an element <<Codestream>> must comprise an element <<MainHeader>> followed by an element <<Tile>>, followed by an element <<EOC>>.

The connector <<xsd: all>> is interpreted in the following fashion by the syntactic analyzer: when the syntactic analyzer finds a connector <<xsd: all>>, it starts by attempting to read the first declared element in the connector <<xsd:

all>>, and if it fails, it attempts to read the second element etc. . . . When it finds an element searched for, it passes to the next element in the connector <<xsd: all>>. It only passes to the next connector when all the elements of the connector <<xsd: all>> have been run through.

The element found in the bit stream does not correspond to the element searched for when the schema defines a fixed value for this element or for one of the sub-elements it contains, and when this value does not correspond to that which is found in the bit stream. For example, when the syntactic analyzer tries to implement an element <<SIZ>>, the element read from the bit stream is not the element searched for if it does not start with <<FF51>> which is the value assigned to the marker <<SIZ>> in the JPEG2000 standard.

The connector <<xsd: all>> is, for example, used in the elements of the type <<MainHeader Type>> defined in annex A.

```
<xsd:complexType name="MainHeaderType">
    <xsd:sequence>
        <xsd:element name="SOC" type="jp2:SOCType"/>
        <xsd:element name="SIZ" type="jp2:SIZType"/>
        <xsd:group>
            <xsd:all>
                <xsd:element name="COD" type="jp2:CODType" minOccurs="0"/>
                <xsd:element name="QCD" type="jp2:QCDType" minOccurs="0"/>
                <xsd:element name="COC" type="jp2:COCType" minOccurs="0"/>
                <xsd:element name="QCC" type="jp2:QCCType" minOccurs="0"/>
                <xsd:element name="RGN" type="jp2:RGNType" minOccurs="0"/>
                <xsd:element name="POC" type="jp2:POCType" minOccurs="0"/>
                <xsd:element name="PPM" type="jp2:PPMType" minOccurs="0"/>
                <xsd:element name="TLM" type="jp2:TLMType" minOccurs="0"/>
                <xsd:element name="PLM" type="jp2:PLMType" minOccurs="0"/>
                <xsd:element name="CRG" type="jp2:CRGType" minOccurs="0"/>
                <xsd:element name="COM" type="jp2:COMType" minOccurs="0"/>
            </xsd:all>
        </xsd:group>
    </xsd:sequence>
</xsd:complexType>
```

According to this definition, an element <<Main-Header>> must comprise an element <<SOC>> followed by an element <<SIZ>> followed by a group which may contain one or more or none of the following elements taken in random order: <<COD>>, <<QCD>>, <<COC>>, <<QCC>>, <<RGN>>, <<POC>>, <<PPM>>, <<TLM>>, <<PLM>>, <<CRG>>.

Although no example whatever is given in annex A, the connector <<xsd: choice>> may also be used. When the syntactic analyzer finds a connector <<xsd: choice>>, it starts trying to read in the bit stream the first element declared in the connector <<xsd: choice>>. When the syntactic analyzer finds the element searched for, it passes to the next connector in the schema. When the read element is not the element searched for, the syntactic analyzer passes to the following element in the same connector <<xsd: choice>>.

Furthermore, the invention introduces the use of variables in the schemas. The notion of variable is used in the XSLT language (XMLExtensible StyleSheet Language Transformation). XSLT is a language specified by the W3C consortium, which permits to define transformations which may be applied to XML documents. In concrete terms, a variable is a character string linked to one value. It may appear at a certain position in a document and be used elsewhere. In accordance with the syntax defined in XSLT, the value of an identified variable by a character string is accessed by placing the $ sign before the character string (worded differently, $ZZZ is the value of the variable identified by the character string ZZZ). The value of a variable is indicated in the definition of the variable. The invention permits to define the value of a variable in the form of a path in an XML tree, by utilizing the syntax defined in the Xpath language (XML Path Language). Xpath is also a language specified by the W3C consortium. The specifications of XSLT and Xpath are available on the Internet site http://www.w3.org.

The use of a variable permits, for example, to define a number of elements by a parameter instead of defining it by a constant value. When the value of a parameter is given at the front of the bit stream, and informs about the structure or the contents of the rest of the bit stream, the value of the variable is defined by the use of the Xpath syntax.

For example, in the JPEG2000 format the number of components <<comp-siz>> contained in the marker segment SIZ is defined in a parameter <<Csiz>> which is placed at the front of the marker segment SIZ. In annex A the element <<Csiz>> is defined as a variable. Its value is defined by a path in the tree-like representation under construction: with respect to this, the expression <<SIZ/Csiz>> indicates that <<Csiz>> is a son element of the element <<SIZ>>. Then, during the definition of the complex type <<SIZ>> this variable <<Csiz>> is called for to determine the number of occurrences of the element <<comp-siz>>.

```
<xsl:variable name="Csiz">
    <xsl:value-of select="SIZ/Csiz"/>
</xsl:variable>
<xsd:element name="Comp_siz" minOccurs="$Csiz"maxOccurs="$Csiz">
```

The invention also comprises the addition of a new group model <<bsd: conditionalChoice>> and two new connectors <<xsl: if>> and <<xsl: choose>>. This permits to introduce conditional branches in the schemas and thus to express conditional choices which may exist in the format one seeks to describe. It will be noted that the connectors <<xsl: if>> and <<xsl: choose>> are defined in the XSLT language. According to the specifications of the XSLT language the connectors <<xsl: if>> and <<xsl: choose>> use an attribute <<test>> which permits to define a choice of function of the result of a test. The connector <<xsl: if>> permits to define a choice as a function of the value of a Boolean variable. The connector <<xsl: choose>> permits to define a choice from a plurality of alternatives.

By way of example the JPEG2000 format provides that the presence of certain elements, or that the type of a data, depends on the value of a parameter which is given at the front of the bit stream.

This is notably the case in the element <<SPcod>> which is contained in the <<COD>> element. The element <<SPcod>> contains an element <<PredinctSize>> solely when the variable <<PredinctsUsed>> has the value of 1. This constraint is expressed in the schema in which a connector <<xsl: if>> is used.

```
<xsd:element name="SPcod">
    <xsd:complexType>
        <xsd:sequence>
            <xsd:element name="nDecompLevels"
                type="xsd:unsignedByte"/>
            <xsd:element name="codeBlockWidth"
                type="jp2:4p4b"/>
            <xsd:element name="codeBlockHeight"
                type="jp2:4p4b"/>
            <xsd:element name="codeBlockStyle">
                <xsd:complexType>
                    <xsd:sequence>
                        <xsd:element name="optSegMarkers"
                            type="jp2:2p1b"/>
                        <xsd:element name="optErTerm"
                            type="jp2:1b"/>
                        <xsd:element name="optVertStrCausal"
                            type="jp2:1b"/>
                        <xsd:element name="optRegTerm"
                            type="jp2:1b"/>
                        <xsd:element name="optResetMQ"
                            type="jp2:1b"/>
                        <xsd:element name="optByPass"
                            type="jp2:1b"/>
                    </xsd:sequence>
                </xsd:complexType>
            </xsd:element>
            <xsd:element name="Transformation"
                type="xsd:unsignedByte"/>
            <xsl:if test="$PrecinctsUsed=1">
                <xsd:element name="PrecinctSize"
                    minOccurs="0">
                    <xsd:complexType>
                        <xsd:sequence>
                            <xsd:element name="PPy"
                                type="jp2:4b"/>
                            <xsd:element name="PPx"
                                type="jp2:4b"/>
                        </xsd:sequence>
                    </xsd:complexType>
                </xsd:element>
            </xsl:if>
        </xsd:complexType>
</xsd:element>
```

In the element <<QCD>> is found an example of a group <<bsd: conditionalChoice>> which uses connectors <<xsl: choose>> to indicate that the type of an element to follow (Spqcd_1>>, Spqcd_2 or Spqcd_3) depends on the value of a parameter <<quantStyle>> which location in the currently processed tree-like representation is given by the path <<QCD/Sqcd/QuantStyle>>.

```
<bsd:conditionalChoice>
    <xsl:choose>
        <xsl:when test="QCD/Sqcd/quantStyle = '0'">
```

-continued

```
            <xsd:element name="Spqcd_1"
                minOccurs="3*$nDecompLevels+1"
                maxOccurs="3*$nDecompLevels+1">
                <xsd:complexType>
                    <xsd:sequence>
                        <xsd:element name="exponent"
                            type="jp2:5b3p"/>
                    </xsd:sequence>
                </xsd:complexType>
            </xsd:element>
        </xsl:when>
        <xsl:when test="QCD/Sqcd/quantStyle = '1'">
            <xsd:element name="Spqcd_2"
                minOccurs="1" maxOccurs="1">
                <xsd:complexType>
                    <xsd:sequence>
                        <xsd:element name="exponent"
                            type="jp2:5b"/>
                        <xsd:element name="mantissa"
                            type="jp2:11b"/>
                    </xsd:sequence>
                </xsd:complexType>
            </xsd:element>
        </xsl:when>
        <xsl:when test="QCD/Sqcd/quantStyle = '2'">
            <xsd:element name="Spqcd_3"
                minOccurs="3*$nDecompLevels+1"
                maxOccurs="3*$nDecompLevels+1">
                <xsd:complexType>
                    <xsd:sequence>
                        <xsd:element name="exponent"
                            type="jp2:5b"/>
                        <xsd:element name="mantissa"
                            type="jp2:11b"/>
                    </xsd:sequence>
                </xsd:complexType>
            </xsd:element>
        </xsl:when>
    </xsl:choose>
</bsd:conditionalChoice>
```

When the syntactic analyzer reads the bit stream, it progressively generates an XML tree. When it comes across a variable in the schema, for example, in an attribute <<test>> of a connector <<if>>, it evaluates this variable by applying the path indicated.

It will be noted that the XML language permits to define its own extensions. A first embodiment of the invention thus comprises the addition of the new tools proposed by the invention as extensions to the existing XML schema language. Another embodiment of the invention comprises a total redefinition of a new language which takes the tools of the XML schema and adds thereto the new tools proposed by the invention.

In FIG. 3 is shown an example of a transmission system according to the invention. The transmission system shown in FIG. 3 comprises a server SV and a plurality of clients CT. The server SV and the clients CT are linked to the Internet WWW. The server SV contains memory means MEM and processing means PROC. The memory means contain notably a schema B2, a first bit stream B1 and a computer program PG1 for implementing a syntactic analysis method according to the invention to obtain a first document B4 which represents the first bit stream B1 and which is an instance of the schema B2. The memory means MEM advantageously also contain a computer program PG2 for implementing a method of generating a second bit stream B'1 from a document B'4 representing same and from the schema B2.

By way of example the document B'4 is obtained by applying a transformation to the document B4, which transformation depends on the profile of a client who has previously requested the transfer of a bit stream.

| Annex A: schema |
|---|

```
<?xml version="1.0" encoding="UTF-8"?>
<!-- Schema of a bitsream compliant to :
    JPEG 2000 Part I Final Draft International Standard
    ISO/IEC JTC1/SC29 WG1, JPEG 2000
-->
<xsd:schema
  targetNamespace="JP2"
  xmlns:jp2="JP2"
  xmlns:xsd="http://www.w3.org/2000/10/XMLSchema"
  xmlns:bsd="BSDLPrimitiveTypes"
  xmlns:xsl="http://www.w3.org/1999/XSL/Transform"
  elementFormDefault="qualified">
  <xsd:include schemaLocation="JP2SimpleTypes.xsd"/>
<!-- ################# Variables ################## -->
  <bsd:variables>
    <xsl:variable name="nDecompLevels">
      <xsl:value-of select="COD/SPcod/nDecompLevels"/>
    </xsl:variable>
    <xsl:variable name="Csiz">
      <xsl:value-of select="SIZ/Csiz"/>
    </xsl:variable>
    <xsl:variable name="PrecinctsUsed">
      <xsl:value-of select="COD/Scod/PrecinctsUsed"/>
    </xsl:variable>
    <xsl:variable name="Lcoc">
      <xsl:value-of select="COC/Lcoc">
    </xsl:variable>
    <xsl:variable name="Lqcc">
      <xsl:value-of select="QCC/Lqcc">
    </xsl:variable>
    <xsl:variable name="Lrgn">
      <xsl:value-of select="RGN/Lrgn">
    </xsl:variable>
    <xsl:variable name="Lpoc">
      <xsl:value-of select="POC/Lpoc">
    </xsl:variable>
    <xsl:variable name="Lppm">
      <xsl:value-of select="PPM/Lppm">
    </xsl:variable>
    <xsl:variable name="Ltlm">
      <xsl:value-of select="TLM/Ltlm">
    </xsl:variable>
    <xsl:variable name="Lcrg">
      <xsl:value-of select="CRG/Lcrg">
    </xsl:variable>
    <xsl:variable name="Lcom">
      <xsl:value-of select="COM/Lcom">
    </xsl:variable>
    <xsl:variable name="Lqcd">
      <xsl:value-of select="QCD/Lqcd">
    </xsl:variable>
    <xsl:variable name="Lppt">
      <xsl:value-of select="PPT/Lppt">
    </xsl:variable>
    <xsl:variable name="Lplt">
      <xsl:value-of select="PLT/Lplt">
    </xsl:variable>
  </bsd:variables>
<!-- ################# Codestream Element Declaration ################## -->
  <xsd:element name="Codestream" type="jp2:CodestreamType"/>
<!-- ################# Codestream complex type ################## -->
  <xsd:complexType name="CodestreamType">
    <xsd:sequence>
      <xsd:element name="MainHeader" type="jp2:MainHeaderType"/>
      <xsd:element name="Tile" type="jp2:TileType"/>
      <xsd:element name="EOC" type="jp2:EOCType"/>
    </xsd:sequence>
  </xsd:complexType>
<!-- ################# MainHeader complex type ################## -->
  <xsd:complexType name="MainHeaderType">
    <xsd:sequence>
      <xsd:element name="SOC"  type="jp2:SOCType"/>
      <xsd:element name="SIZ"  type="jp2:SIZType"/>
      <xsd:group>
        <xsd:all>
          <xsd:element name="COD"  type="jp2:CODType"  minOccurs="0"/>
          <xsd:element name="QCD"  type="jp2:QCDType"  minOccurs="0"/>
```

-continued

Annex A: schema

```
            <xsd:element name="COC"       type="jp2:COCType"       minOccurs="0"/>
            <xsd:element name="QCC"       type="jp2:QCCType"       minOccurs="0"/>
            <xsd:element name="RGN"       type="jp2:RGNType"       minOccurs="0"/>
            <xsd:element name="POC"       type="jp2:POCType"       minOccurs="0"/>
            <xsd:element name="PPM"       type="jp2:PPMType"       minOccurs="0"/>
            <xsd:element name="TLM"       type="jp2:TLMType"       minOccurs="0"/>
            <xsd:element name="PLM"       type="jp2:PLMType"       minOccurs="0"/>
            <xsd:element name="CRG"       type="jp2:CRGType"       minOccurs="0"/>
            <xsd:element name="COM"       type="jp2:COMType"       minOccurs="0"/>
         </xsd:all>
      </xsd:group>
   </xsd:sequence>
</xsd:complexType>
<!-- ################# Tile complex type ################# -->
<xsd:complexType name="TileType">
   <xsd:sequence>
      <xsd:element name="TileHeader"   type="jp2:TileHeaderType"/>
      <xsd:element name="Bitstream"    type="jp2:BitstreamType"/>
   </xsd:sequence>
</xsd:complexType>
<!-- ################# TileHeader complex type ################# -->
<xsd:complexType name="TileHeaderType">
   <xsd:sequence>
      <xsd:element name="SOT" type="jp2:SOTType"/>
      <xsd:group>
         <xsd:all>
            <xsd:element name="COD"       type="jp2:CODType"       minOccurs="0"/>
            <xsd:element name="COC"       type="jp2:COCType"       minOccurs="0"/>
            <xsd:element name="QCD"       type="jp2:QCDType"       minOccurs="0"/>
            <xsd:element name="QCC"       type="jp2:QCCType"       minOccurs="0"/>
            <xsd:element name="RGN"       type="jp2:RGNType"       minOccurs="0"/>
            <xsd:element name="POC"       type="jp2:POCType"       minOccurs="0"/>
            <xsd:element name="PPT"       type="jp2:PPTType"       minOccurs="0"/>
            <xsd:element name="PLT"       type="jp2:PLTType"       minOccurs="0"/>
            <xsd:element name="COM"       type="jp2:COMType"       minOccurs="0"/>
         </xsd:all>
      </xsd:group>
      <xsd:element name="SOD" type="jp2:SODType"/>
   </xsd:sequence>
</xsd:complexType>
<!-- ################# Bitstream complex type ################# -->
<xsd:complexType name="BitstreamType">
   <xsd:sequence>
      <xsd:element name="Packet" maxOccurs="unbounded">
         <xsd:complexType>
            <xsd:sequence>
               <xsd:element name="SOP" type="jp2:SOPType"/>
               <xsd:element name="Data">
                  <xsd:simpleType>
                     <xsd:union memberTypes="jp2:packetDataType"/>
                  </xsd:simpleType>
               </xsd:element>
            </xsd:sequence>
         </xsd:complexType>
      </xsd:element>
   </xsd:sequence>
</xsd:complexType>
<!-- ######################################################## -->
<!-- ##                    Marker Segments                ## -->
<!-- ######################################################## -->
<!-- ################# SOC complex type ################# -->
<xsd:complexType name="SOCType">
   <xsd:sequence>
      <xsd:element name="Marker" type="jp2:markerType" fixed="ff4f"/>
   </xsd:sequence>
</xsd:complexType>
<!-- ################# SIZ complex type ################# -->
<xsd:complexType name="SIZType">
   <xsd:sequence>
      <xsd:element name="Marker"    type="jp2:markerType" fixed="ff51"/>
      <xsd:element name="Lsiz"      type="xsd:unsignedShort"/>
      <xsd:element name="Rsiz"      type="xsd:unsignedShort"/>
      <xsd:element name="Xsiz"      type="xsd:unsignedInt"/>
      <xsd:element name="Ysiz"      type="xsd:unsignedInt"/>
      <xsd:element name="XOsiz"     type="xsd:unsignedInt"/>
      <xsd:element name="YOsiz"     type="xsd:unsignedInt"/>
      <xsd:element name="XTsiz"     type="xsd:unsignedInt"/>
```

-continued

Annex A: schema

```
        <xsd:element name="YTsiz"        type="xsd:unsignedInt"/>
        <xsd:element name="XTOsiz"       type="xsd:unsignedInt"/>
        <xsd:element name="YTOsiz"       type="xsd:unsignedInt"/>
        <xsd:element name="Csiz"         type="xsd:unsignedShort"/>
        <xsd:element name="Comp_siz" minOccurs="$Csiz" maxOccurs="$Csiz">
           <xsd:complexType>
              <xsd:sequence>
                 <xsd:element name="Ssiz">
                    <xsd:complexType>
                       <xsd:sequence>
                          <xsd:element name="sign" type="jp2:1b"/>
                          <xsd:element name="bitDepth" type="jp2:7b"/>
                       </xsd:sequence>
                    </xsd:complexType>
                 </xsd:element>
                 <xsd:element name="XRsiz" type="xsd:unsignedByte"/>
                 <xsd:element name="YRsiz" type="xsd:unsignedByte"/>
              </xsd:sequence>
           </xsd:complexType>
        </xsd:element>
     </xsd:sequence>
  </xsd:complexType>
<!-- ################# COD complex type ################# -->
<xsd:complexType name="CODType">
   <xsd:sequence>
      <xsd:element name="Marker" type="jp2:markerType" fixed="ff52"/>
      <xsd:element name="Lcod" type="xsd:unsignedShort"/>
      <xsd:element name="Scod">
         <xsd:complexType>
            <xsd:sequence>
               <xsd:element name="EPHMarkersUsed"   type="jp2:5p1b"/>
               <xsd:element name="SOPMarkersUsed"   type="jp2:1b"/>
               <xsd:element name="PrecinctsUsed"    type="jp2:1b"/>
            </xsd:sequence>
         </xsd:complexType>
      </xsd:element>
      <xsd:element name="SGcod">
         <xsd:complexType>
            <xsd:sequence>
               <xsd:element name="progType"   type="xsd:unsignedByte"/>
               <xsd:element name="numLayers"  type="xsd:unsignedShort"/>
               <xsd:element name="mct"        type="xsd:unsignedByte"/>
            </xsd:sequence>
         </xsd:complexType>
      </xsd:element>
      <xsd:element name="SPcod">
         <xsd:complexType>
            <xsd:sequence>
               <xsd:element name="nDecompLevels"   type="xsd:unsignedByte"/>
               <xsd:element name="codeBlockWidth"  type="jp2:4p4b"/>
               <xsd:element name="codeBlockHeight" type="jp2:4p4b"/>
               <xsd:element name="codeBlockStyle">
                  <xsd:complexType>
                     <xsd:sequence>
                        <xsd:element name="optSeqMarkers"   type="jp2:2p1b"/>
                        <xsd:element name="optErTerm"       type="jp2:1b"/>
                        <xsd:element name="optVertStrCausal" type="jp2:1b"/>
                        <xsd:element name="optRegTerm"      type="jp2:1b"/>
                        <xsd:element name="optResetMQ"      type="jp2:1b"/>
                        <xsd:element name="optByPass"       type="jp2:1b"/>
                     </xsd:sequence>
                  </xsd:complexType>
               </xsd:element>
               <xsd:element name="Transformation"   type="xsd:unsignedByte"/>
               <xsl:if test="$PrecinctsUsed=1">
                  <xsd:element name="PrecinctSize" minOccurs="0">
                     <xsd:complexType>
                        <xsd:sequence>
                           <xsd:element name="PPy" type="jp2:4b"/>
                           <xsd:element name="PPx" type="jp2:4b"/>
                        </xsd:sequence>
                     </xsd:complexType>
                  </xsd:element>
               </xsl:if>
            </xsd:sequence>
         </xsd:complexType>
      </xsd:element>
```

Annex A: schema

```
      </xsd:sequence>
    </xsd:complexType>
<!-- ################# QCD complex type ################# -->
<xsd:complexType name="QCDType">
  <xsd:sequence>
    <xsd:element name="Marker" type="jp2:markerType" fixed="ff5c"/>
    <xsd:element name="Lqcd" type="xsd:unsignedShort"/>
    <xsd:element name="Sqcd">
      <xsd:complexType>
        <xsd:sequence>
          <xsd:element name="guardBits" type="jp2:3b"/>
          <xsd:element name="quantStyle" type="jp2:5b"/>
        </xsd:sequence>
      </xsd:complexType>
    </xsd:element>
    <bsd:conditionalChoice>
      <xsl:choose>
        <xsl:when test="QCD/Sqcd/quantStyle = '0'">
          <xsd:element name="Spqcd_1"  minOccurs="3*$nDecompLevels+1"
                                      maxOccurs="3*$nDecompLevels+1">
            <xsd:complexType>
              <xsd:sequence>
                <xsd:element name="exponent" type="jp2:5b3p"/>
              </xsd:sequence>
            </xsd:complexType>
          </xsd:element>
        </xsl:when>
        <xsl:when test="QCD/Sqcd/quantStyle = '1'">
          <xsd:element name="Spqcd_2"  minOccurs="1" maxOccurs="1">
            <xsd:complexType>
              <xsd:sequence>
                <xsd:element name="exponent"  type="jp2:5b"/>
                <xsd:element name="mantissa"  type="jp2:11b"/>
              </xsd:sequence>
            </xsd:complexType>
          </xsd:element>
        </xsl:when>
        <xsl:when test="QCD/Sqcd/quantStyle ='2'">
          <xsd:element name="Spqcd_3"  minOccurs="3*$nDecompLevels+1"
                                      maxOccurs="3*$nDecompLevels+1">
            <xsd:complexType>
              <xsd:sequence>
                <xsd:element name="exponent"  type="jp2:5b"/>
                <xsd:element name="mantissa"  type="jp2:11b"/>
              </xsd:sequence>
            </xsd:complexType>
          </xsd:element>
        </xsl:when>
      </xsl:choose>
    </bsd:conditionalChoice>
  </xsd:sequence>
</xsd:complexType>
<!-- ################# SOT complex type ################# -->
<xsd:complexType name="SOTType">
  <xsd:sequence>
    <xsd:element name="Marker"  type="jp2:markerType" fixed="ff90"/>
    <xsd:element name="Lsot"    type="xsd:unsignedShort" fixed="10"/>
    <xsd:element name="Isot"    type="xsd:unsignedShort"/>
    <xsd:element name="Psot"    type="xsd:unsignedInt"/>
    <xsd:element name="TPsot"   type="xsd:unsignedByte"/>
    <xsd:element name="TNsot"   type="xsd:unsignedByte"/>
  </xsd:sequence>
</xsd:complexType>
<!-- ################# SOD complex type ################# -->
<xsd:complexType name="SODType">
  <xsd:sequence>
    <xsd:element name="Marker" type="jp2:markerType" fixed="ff93"/>
  </xsd:sequence>
</xsd:complexType>
<!-- ################# SOP complex type ################# -->
<xsd:complexType name="SOPType">
  <xsd:sequence>
    <xsd:element name="Marker"  type="jp2:markerType" fixed="ff91"/>
    <xsd:element name="Lsop"    type="xsd:unsignedShort" fixed="4"/>
    <xsd:element name="Nsop"    type="xsd:unsignedShort"/>
  </xsd:sequence>
</xsd:complexType>
```

-continued

Annex A: schema

```xml
<!-- ################# EOC complex type ################# -->
<xsd:complexType name="EOCType">
   <xsd:sequence>
      <xsd:element name="Marker" type="jp2:markerType" fixed="ffd9"/>
   </xsd:sequence>
</xsd:complexType>
<!-- ######################################################## -->
<!-- ##          Non implemented Marker Segments                 ## -->
<!-- ######################################################## -->
<!-- For the following markers, different parameters are not read
           individually because they are not needed in the application.
           Instead, the marker segment content is read as a whole using
           the length information given after the marker -->
<!-- ################# COC complex type ################# -->
<xsd:complexType name="COCType">
   <xsd:sequence>
      <xsd:element name="Marker"   type="jp2:markerType" fixed="ff53"/>
      <xsd:element name="Lcoc"     type="xsd:unsignedShort"/>
      <xsd:element name="data">
         <xsd:simpleType>
            <xsd:restriction base="xsd:binary">
               <xsd:length value="$Lcoc"/>
               <xsd:encoding value="base64"/>
            </xsd:restriction>
         </xsd:simpleType>
      </xsd:element>
   </xsd:sequence>
</xsd:complexType>
<!-- ################# QCC complex type ################# -->
<xsd:complexType name="QCCType">
   <xsd:sequence>
      <xsd:element name="Marker"   type="jp2:markerType" fixed="ff5d"/>
      <xsd:element name="Lqcc"     type="xsd:unsignedShort"/>
      <xsd:element name="data">
         <xsd:simpleType>
            <xsd:restriction base="xsd:binary">
               <xsd:length value="$Lqcc"/>
               <xsd:encoding value="base64"/>
            </xsd:restriction>
         </xsd:simpleType>
      </xsd:element>
   </xsd:sequence>
</xsd:complexType>
<!-- ################# RGN complex type ################# -->
<xsd:complexType name="RGNType">
   <xsd:sequence>
      <xsd:element name="Marker"   type="jp2:markerType" fixed="ff5e"/>
      <xsd:element name="Lrgn"     type="xsd:unsignedShort"/>
      <xsd:element name="data">
         <xsd:simpleType>
            <xsd:restriction base="xsd:binary">
               <xsd:length value="$Lrgn"/>
               <xsd:encoding value="base64"/>
            </xsd:restriction>
         </xsd:simpleType>
      </xsd:element>
   </xsd:sequence>
</xsd:complexType>
<!-- ################# POC complex type ################# -->
<xsd:complexType name="POCType">
   <xsd:sequence>
      <xsd:element name="Marker"   type="jp2:markerType" fixed="ff5f"/>
      <xsd:element name="Lpoc"     type="xsd:unsignedShort"/>
      <xsd:element name="data">
         <xsd:simpleType>
            <xsd:restriction base="xsd:binary">
               <xsd:length value="$Lpoc"/>
               <xsd:encoding value="base64"/>
            </xsd:restriction>
         </xsd:simpleType>
      </xsd:element>
   </xsd:sequence>
</xsd:complexType>
<!-- ################# PPM complex type ################# -->
<xsd:complexType name="PPMType">
   <xsd:sequence>
      <xsd:element name="Marker"   type="jp2:markerType" fixed="ff60"/>
```

-continued

Annex A: schema

```
      <xsd:element name="Lppm"    type="xsd:unsignedShort"/>
      <xsd:element name="data">
        <xsd:simpleType>
          <xsd:restriction base="xsd:binary">
            <xsd:length value="$Lppm"/>
            <xsd:encoding value="base64"/>
          </xsd:restriction>
        </xsd:simpleType>
      </xsd:element>
    </xsd:sequence>
</xsd:complexType>
<!-- ################ TLM complex type ################ -->
<xsd:complexType name="TLMType">
  <xsd:sequence>
      <xsd:element name="Marker"  type="jp2:markerType" fixed="ff55"/>
      <xsd:element name="Ltlm"    type="xsd:unsignedShort"/>
      <xsd:element name="data">
        <xsd:simpleType>
          <xsd:restriction base="xsd:binary">
            <xsd:length value="$Ltlm"/>
            <xsd:encoding value="base64"/>
          </xsd:restriction>
        </xsd:simpleType>
      </xsd:element>
    </xsd:sequence>
</xsd:complexType>
<!-- ################ PLM complex type ################ -->
<xsd:complexType name="PLMType">
  <xsd:sequence>
      <xsd:element name="Marker"  type="jp2:markerType" fixed="ff57"/>
      <xsd:element name="Lplm"    type="xsd:unsignedShort"/>
      <xsd:element name="data">
        <xsd:simpleType>
          <xsd:restriction base="xsd:binary">
            <xsd:length value="$Lplm"/>
            <xsd:encoding value="base64"/>
          </xsd:restriction>
        </xsd:simpleType>
      </xsd:element>
    </xsd:sequence>
</xsd:complexType>
<!-- ################ CRG complex type ################ -->
<xsd:complexType name="CRGType">
  <xsd:sequence>
      <xsd:element name="Marker"  type="jp2:markerType" fixed="ff63"/>
      <xsd:element name="Lcrg"    type="xsd:unsignedShort"/>
      <xsd:element name="data">
        <xsd:simpleType>
          <xsd:restriction base="xsd:binary">
            <xsd:length value="$Lcrg"/>
            <xsd:encoding value="base64"/>
          </xsd:restriction>
        </xsd:simpleType>
      </xsd:element>
    </xsd:sequence>
</xsd:complexType>
<!-- ################ COM complex type ################ -->
<xsd:complexType name="COMType">
  <xsd:sequence>
      <xsd:element name="Marker"  type="jp2:markerType" fixed="ff64"/>
      <xsd:element name="Lcom"    type="xsd:unsignedShort"/>
      <xsd:element name="data">
        <xsd:simpleType>
          <xsd:restriction base="xsd:binary">
            <xsd:length value="$Lcom"/>
            <xsd:encoding value="base64"/>
          </xsd:restriction>
        </xsd:simpleType>
      </xsd:element>
    </xsd:sequence>
</xsd:complexType>
<!-- ################ PPT complex type ################ -->
<xsd:complexType name="PPTType">
  <xsd:sequence>
      <xsd:element name="Marker"  type="jp2:markerType" fixed="ff61"/>
      <xsd:element name="Lppt"    type="xsd:unsignedShort"/>
      <xsd:element name="data">
```

Annex A: schema

```
        <xsd:simpleType>
           <xsd:restriction base="xsd:binary">
              <xsd:length value="$Lppt"/>
              <xsd:encoding value="base64"/>
           </xsd:restriction>
        </xsd:simpleType>
      </xsd:element>
   </xsd:sequence>
</xsd:complexType>
<!-- ################ PLT complex type ################ -->
<xsd:complexType name="PLTType">
   <xsd:sequence>
      <xsd:element name="Marker"  type="jp2:markerType" fixed="ff58"/>
      <xsd:element name="Lplt"    type="xsd:unsignedShort"/>
      <xsd:element name="data">
        <xsd:simpleType>
           <xsd:restriction base="xsd:binary">
              <xsd:length value="$Lplt"/>
              <xsd:encoding value="base64"/>
           </xsd:restriction>
        </xsd:simpleType>
      </xsd:element>
   </xsd:sequence>
</xsd:complexType>
</xsd:schema>
```

Annex B: Simple types used in the schema

```
<?xml version="1.0" encoding="UTF-8"?>
<xsd:schema
    targetNamespace="JP2"
    xmlns:jp2="JP2"
    xmlns:xsd="http://www.w3.org/2000/10/XMLSchema"
    xmlns:bsd="BSDLPrimitiveTypes"
    elementFormDefault="qualified">
  <xsd:import namespace=" " schemaLocation="BSDLPrimitiveTypes.xsd"/>
  <!-- ################ Simple Types Definition ################ -->
  <!-- ################ markerType ################ -->
  <xsd:simpleType name="markerType">
     <xsd:restriction base="xsd:binary">
        <xsd:encoding value="hex"/>
        <xsd:length value="2"/>
     </xsd:restriction>
  </xsd:simpleType>
  <!-- ################ bitstreamType ################ -->
  <!-- This type used for bitstream packets -->
  <!-- They are delimited by either:
           - a new SOP marker  (FF51)
           - a new SOT marker  (FF90)
           - the EOC marker    (FFD9) -->
  <xsd:simpleType name="packetDataType">
     <xsd:restriction base="bsd:binaryNoLength">
        <xsd:encoding value="externalData"/>
        <bsd:stopFlagExclusive value="FF51 | FFD9 | FF90"/>
     </xsd:restriction>
  </xsd:simpleType>
  <xsd:simpleType name="11b">
     <xsd:restriction base="bsd:bitsArray">
        <bsd:bitsLength value="11"/>
     </xsd:restriction>
  </xsd:simpleType>
  <xsd:simpleType name="7b">
     <xsd:restriction base="bsd:bitsArray">
        <bsd:bitsLength value="7"/>
     </xsd:restriction>
  </xsd:simpleType>
  <xsd:simpleType name="5b">
     <xsd:restriction base="bsd:bitsArray">
        <bsd:bitsLength value="5"/>
     </xsd:restriction>
  </xsd:simpleType>
  <xsd:simpleType name="4b">
```

Annex B: Simple types used in the schema

```xml
      <xsd:restriction base="bsd:bitsArray">
         <bsd:bitsLength value="4"/>
      </xsd:restriction>
   </xsd:simpleType>
   <xsd:simpleType name="3b">
      <xsd:restriction base="bsd:bitsArray">
         <bsd:bitsLength value="3"/>
      </xsd:restriction>
   </xsd:simpleType>
   <xsd:simpleType name="1b">
      <xsd:restriction base="bsd:bitsArray">
         <bsd:bitsLength value="1"/>
      </xsd:restriction>
   </xsd:simpleType>
   <xsd:simpleType name="2p1b">
      <xsd:restriction base="bsd:bitsArray">
         <bsd:bitsLength value="1"/>
         <bsd:prePadding value="2"/>
      </xsd:restriction>
   </xsd:simpleType>
   <xsd:simpleType name="5p1b">
      <xsd:restriction base="bsd:bitsArray">
         <bsd:bitsLength value="1"/>
         <bsd:prePadding value="5"/>
      </xsd:restriction>
   </xsd:simpleType>
   <xsd:simpleType name="5b3p">
      <xsd:restriction base="bsd:bitsArray">
         <bsd:bitsLength value="5"/>
         <bsd:postPadding value="3"/>
      </xsd:restriction>
   </xsd:simpleType>
   <xsd:simpleType name="4p4b">
      <xsd:restriction base="bsd:bitsArray">
         <bsd:bitsLength value="4"/>
         <bsd:prePadding value="4"/>
      </xsd:restriction>
   </xsd:simpleType>
</xsd:schema>
```

Annex C: Generic types used in the schema

```xml
<?xml version="1.0" encoding="UTF-8"?>
<xsd:schema
   targetNamespace="BSDLPrimitiveTypes"
   xmlns:bsd="BSDLPrimitiveTypes"
   xmlns:xsd="http://www.w3.org/2000/10/XMLSchema"
   elementFormDefault="qualified">
<!-- ################# bitsArray ################# -->
   <xsd:simpleType name="bitsArray">
      <xsd:annotation>
         <xsd:appinfo>
            <xsd:hasFacet name="bitsLength"/>
            <xsd:hasFacet name="prePadding"/>
            <xsd:hasFacet name="postPadding"/>
         </xsd:appinfo>
      </xsd:annotation>
      <xsd:restriction base="xsd:anySimpleType"/>
   </xsd:simpleType>
<!-- ################# binaryNoLength ################# -->
   <xsd:simpleType name="binaryNoLength">
      <xsd:annotation>
         <xsd:appinfo>
            <!-- Read data until a flag is found -->
            <xsd:hasFacet name="stopFlagExclusive"/>
            <!-- How binary data should be instantiated : -->
            <!--    base64, hex (same as for xsd:binary) -->
            <!--    externalData (URI pointing to an external entity data segment) -->
            <xsd:hasFacet name="encoding"/>
         </xsd:appinfo>
```

Annex C: Generic types used in the schema

```
    </xsd:annotation>
    <xsd:restriction base="xsd:anySimpleType"/>
  </xsd:simpleType>
</xsd:schema>
```

Annex D: Instance document of the schema

```
<?xml version="1.0"?>
<!-- example of an XML representation of a JP2 bitstream -->
<Codestream
    xmlns="JP2"
    xmlns:xsi="http://www.w3.org/2000/10/XMLSchema-instance"
    xsi:schemaLocation="JP2 JP2.xsd">
  <MainHeader>
    <SOC>
      <Marker>FF4F</Marker>
    </SOC>
    <SIZ>
      <Marker>ff51</Marker>
      <Lsiz>47</Lsiz>
      <Rsiz>0</Rsiz>
      <Xsiz>515</Xsiz>
      <Ysiz>512</Ysiz>
      <XOsiz>0</XOsiz>
      <YOsiz>0</YOsiz>
      <XTsiz>515</XTsiz>
      <YTsiz>512</YTsiz>
      <XTOsiz>0</XTOsiz>
      <YTOsiz>0</YTOsiz>
      <Csiz>3</Csiz>
      <Comp_siz>
        <Ssiz>
          <sign>0</sign>
          <bitDepth>7 </bitDepth>
        </Ssiz>
        <XRsiz>1</XRsiz>
        <YRsiz>1</YRsiz>
      </Comp_siz>
      <Comp_siz>
        <Ssiz>
          <sign>0</sign>
          <bitDepth>7</bitDepth>
        </Ssiz>
        <XRsiz>1</XRsiz>
        <YRsiz>1</YRsiz>
      </Comp_siz>
      <Comp_siz>
        <Ssiz>
          <sign>0</sign>
          <bitDepth>7</bitDepth>
        </Ssiz>
        <XRsiz>1</XRsiz>
        <YRsiz>1</YRsiz>
      </Comp_siz>
    </SIZ>
    <COD>
      <Marker>ff52</Marker>
      <Lcod>12</Lcod>
      <Scod>
        <EPHMarkersUsed>0</EPHMarkersUsed>
        <SOPMarkersUsed>1</SOPMarkersUsed>
        <PrecinctsUsed>0</PrecinctsUsed>
      </Scod>
      <SGcod>
        <progType>4</progType>
        <numLayers>1</numLayers>
        <mct>1</mct>
      </SGcod>
      <SPcod>
        <nDecompLevels>5</nDecompLevels>
        <codeBlockWidth>4</codeBlockWidth>
        <codeBlockHeight>4</codeBlockHeight>
        <codeBlockStyle>
          <optSegMarkers>0</optSegMarkers>
          <optErTerm>0</optErTerm>
          <optVertStrCausal>0</optVertStrCausal>
          <optRegTerm>0</optRegTerm>
          <optResetMQ>0</optResetMQ>
          <optByPass>0</optByPass>
        </codeBlockStyle>
        <Transformation>0</Transformation>
      </SPcod>
    </COD>
    <QCD>
      <Marker>ff5c</Marker>
      <Lqcd>35</Lqcd>
      <Sqcd>
        <guardBits>2</guardBits>
        <quantStyle>2</quantStyle>
      </Sqcd>
      <Spqcd_3>
        <exponent>13</exponent>
        <mantissa>1816</mantissa>
      </Spqcd_3>
      <Spqcd_3>
        <exponent>13</exponent>
        <mantissa>1770</mantissa>
      </Spqcd_3>
      <Spqcd_3>
        <exponent>13</exponent>
        <mantissa>1770</mantissa>
      </Spqcd_3>
      <Spqcd_3>
        <exponent>13</exponent>
        <mantissa>1724</mantissa>
      </Spqcd_3>
      <Spqcd_3>
        <exponent>12</exponent>
        <mantissa>1792</mantissa>
      </Spqcd_3>
      <Spqcd_3>
        <exponent>12</exponent>
        <mantissa>1792</mantissa>
      </Spqcd_3>
      <Spqcd_3>
        <exponent>12</exponent>
        <mantissa>1762</mantissa>
      </Spqcd_3>
      <Spqcd_3>
        <exponent>11</exponent>
        <mantissa>1868</mantissa>
      </Spqcd_3>
      <Spqcd_3>
        <exponent>11</exponent>
        <mantissa>1868</mantissa>
      </Spqcd_3>
      <Spqcd_3>
        <exponent>11</exponent>
        <mantissa>1892</mantissa>
      </Spqcd_3>
      <Spqcd_3>
        <exponent>9</exponent>
        <mantissa>3</mantissa>
      </Spqcd_3>
      <Spqcd_3>
```

Annex D: Instance document of the schema

```
            <exponent>9</exponent>
            <mantissa>3</mantissa>
        </Spqcd_3>
        <Spqcd_3>
            <exponent>9</exponent>
            <mantissa>69</mantissa>
        </Spqcd_3>
        <Spqcd_3>
            <exponent>9</exponent>
            <mantissa>2002</mantissa>
        </Spqcd_3>
        <Spqcd_3>
            <exponent>9</exponent>
            <mantissa>2002</mantissa>
        </Spqcd_3>
        <Spqcd_3>
            <exponent>9</exponent>
            <mantissa>1889</mantissa>
        </Spqcd_3>
    </QCD>
</MainHeader>
<Tile>
    <TileHeader>
        <SOT>
            <Marker>ff90</Marker>
            <Lsot>10</Lsot>
            <Isot>0</Isot>
            <Psot>32722</Psot>
            <TPsot>0</TPsot>
            <TNsot>1</TNsot>
        </SOT>
        <SOD>
            <Marker>FF93</Marker>
        </SOD>
    </TileHeader>
    <Bitstream>
        <Packet>
            <SOP>
                <Marker>ff91</Marker>
                <Lsop>4</Lsop>
                <Nsop>0</NsoP>
            </SOP>
            <Data>bachComp3.jp2#122–363</Data>
        </Packet>
        <Packet>
            <SOP>
                <Marker>ff91</Marker>
                <Lsop>4</Lsop>
                <Nsop>1</Nsop>
            </SOP>
            <Data>bachComp3.jp2#370–861</Data>
        </Packet>
        <Packet>
            <SOP>
                <Marker>ff91</Marker>
                <Lsop>4</Lsop>
                <Nsop>2</Nsop>
            </SOP>
            <Data>bachComp3.jp2#868–2362</Data>
        </Packet>
        <Packet>
            <SOP>
                <Marker>ff91</Marker>
                <Lsop>4</Lsop>
                <Nsop>3</Nsop>
            </SOP>
            <Data>bachComp3.jp2#2369–6788</Data>
        </Packet>
        <Packet>
            <SOP>
                <Marker>ff91</Marker>
                <Lsop>4</Lsop>
                <Nsop>4</Nsop>
            </SOP>
            <Data>bachComp3.jp2#6795–17999</Data>
        </Packet>
        <Packet>
```

Annex D: Instance document of the schema

```
            <SOP>
                <Marker>ff91</Marker>
                <Lsop>4</Lsop>
                <Nsop>5</Nsop>
            </SOP>
            <Data>bachComp3.jp2#18006–26441</Data>
        </Packet>
        <Packet>
            <SOP>
                <Marker>ff91</Marker>
                <Lsop>4</Lsop>
                <Nsop>6</Nsop>
            </SOP>
            <Data>bachComp3.jp2#26448–26577</Data>
        </Packet>
        <Packet>
            <SOP>
                <Marker>ff91</Marker>
                <Lsop>4</Lsop>
                <Nsop>7</Nsop>
            </SOP>
            <Data>bachComp3.jp2#26584–26875</Data>
        </Packet>
        <Packet>
            <SOP>
                <Marker>ff91</Marker>
                <Lsop>4</Lsop>
                <Nsop>8</Nsop>
            </SOP>
            <Data>bachComp3.jp2#26882–27675</Data>
        </Packet>
        <Packet>
            <SOP>
                <Marker>ff91</Marker>
                <Lsop>4</Lsop>
                <Nsop>9</Nsop>
            </SOP>
            <Data>bachComp3.jp2#27682–29664</Data>
        </Packet>
        <Packet>
            <SOP>
                <Marker>ff91</Marker>
                <Lsop>4</Lsop>
                <Nsop>10</Nsop>
            </SOP>
            <Data>bachComp3.jp2#29671–31086</Data>
        </Packet>
        <Packet>
            <SOP>
                <Marker>ff91</Marker>
                <Lsop>4</Lsop>
                <Nsop>11</Nsop>
            </SOP>
            <Data>bachComp3.jp2#31093–31389</Data>
        </Packet>
        <Packet>
            <SOP>
                <Marker>ff91</Marker>
                <Lsop>4</Lsop>
                <Nsop>12</Nsop>
            </SOP>
            <Data>bachComp3.jp2#31396–31498</Data>
        </Packet>
        <Packet>
            <SOP>
                <Marker>ff91</Marker>
                <Lsop>4</Lsop>
                <Nsop>13</Nsop>
            </SOP>
            <Data>bachComp3.jp2#31505–31688</Data>
        </Packet>
        <Packet>
            <SOP>
                <Marker>ff91</Marker>
                <Lsop>4</Lsop>
                <Nsop>14</Nsop>
            </SOP>
```

-continued

Annex D: Instance document of the schema

```
        <Data>bachComp3.jp2#31695-31956</Data>
    </Packet>
    <Packet>
        <SOP>
            <Marker>ff91</Marker>
            <Lsop>4</Lsop>
            <Nsop>15</Nsop>
        </SOP>
        <Data>bachComp3.jp2#31963-32497</Data>
    </Packet>
    <Packet>
        <SOP>
            <Marker>ff91</Marker>
            <Lsop>4</Lsop>
            <Nsop>16</Nsop>
        </SOP>
        <Data>bachComp3.jp2#32504-32816</Data>
    </Packet>
    <Packet>
        <SOP>
            <Marker>ff91</Marker>
            <Lsop>4</Lsop>
            <Nsop>17</Nsop>
        </SOP>
        <Data>bachComp3.jp2#32823-32823</Data>
    </Packet>
    </Bitstream>
    </Tile>
    <EOC>
        <Marker>FFD9</Marker>
    </EOC>
</Codestream>
```

The invention claimed is:

1. A method of syntactically analyzing a bit stream containing data which have a structure and contents according to a certain format, said method being intended to generate a tree-like representation of said stream, characterized in that said method comprises:

A) reading a schema which, for generically describing said format:

a) defines one or more types of data which may contain one or more facets, notably:

when said format uses binary words of predefined length or lengths: one or more types of data corresponding to said binary words of predefined length or lengths, said binary words of predefined lengths may contain one or more padding bits, said types of data having at least one facet relating to said length and said padding bits, when said format uses binary segments of indefinite length which have contents intended to be imported in said representation by using a certain import mode: a type of data corresponding to said binary segments defined by a stop flag, said type of data having at least one facet relating to import mode and relating to said stop flag, b) comprises a plurality of elements for which it describes a name, a type of data, an interleaving, a predefined or random order and number of occurrences, the occurrence of an element being mandatory or optional, c) when said format provides that data situated at the front of said bit stream gives information about the structure or the contents of the rest of said bit stream, defines one or various variables constituted by an access path in said tree-like representation to said data situated at the front, and comprises one or more conditional branches for describing various possible structures or contents as a function of the value of said variable or variables, B) searching in said bit stream for the data that corresponds to the elements contained in said schema, C) generating an instance of said schema which contains the data found in said bit stream and which constitutes said tree-like representation.

2. A computer program comprising instructions for implementing a syntactic analysis method as claimed in claim 1.

3. A method of generating a bit stream according to a certain format, from a document which is a tree-like representation of said bit stream and which contains data, notably data imported by the use of a certain import mode, characterized in that it comprises:

A) reading said document

B) reading in parallel a schema which, for generically describing said format:

a) defines one or more types of data which may have one or more facets, notably:

a type of data corresponding to binary segments of indefinite length which have at least a facet that relates to said import mode and, when said fonnat uses binary words of predefined length or lengths, one or more types of data corresponding to said binary words of predefined length or lengths which have at least a facet that relates to said length, and when said binary words contain one or more padding bits, a facet tat relates to said padding bits, b) comprises a plurality of elements for which it describes a name, a type of data, an interleaving, an order and a number of predefined or random occurrences, the occurrence of an element being mandatory or optional, C) coding said data as a function of the type defined, D) constituting a bit stream from the coded data.

4. A computer program comprising instructions for implementing a method of generating a bit stream as claimed in claim 3.

5. A transmission system comprising at least a source entity and at least a destination entity, said source entity comprising memory means for storing a schema as defined in claim 1, and memory means for storing a program which contains instructions for implementing a syntactic analysis method of a bit stream based on said schema for generating a document which represents said bit stream which is an instance of said schema, and/or a program which contains instructions for implementing a method of generating a bit stream based on said schema and on a document representing said bit stream which is an instance of said schema as claimed in claim 1.

* * * * *